US012387624B2

(12) United States Patent
Yang

(10) Patent No.: US 12,387,624 B2
(45) Date of Patent: Aug. 12, 2025

(54) LABEL AND BEVERAGE CONTAINER WITH LABEL ATTACHED

(71) Applicant: STUDIO EIGHT LLC, Los Gatos, CA (US)

(72) Inventor: Tung-Po Yang, Los Gatos, CA (US)

(73) Assignee: STUDIO EIGHT LLC, Los Gatos, CA (US)

( * ) Notice: Subject to any disclaimer, the term of this patent is extended or adjusted under 35 U.S.C. 154(b) by 265 days.

(21) Appl. No.: 18/118,882

(22) Filed: Mar. 8, 2023

(65) Prior Publication Data

US 2024/0304112 A1 Sep. 12, 2024

(51) Int. Cl.
*G09F 3/02* (2006.01)
*B65D 23/06* (2006.01)
(Continued)

(52) U.S. Cl.
CPC ......... *G09F 3/0288* (2013.01); *B65D 23/065* (2013.01); *B65D 23/14* (2013.01);
(Continued)

(58) Field of Classification Search
CPC ................. G09F 3/0288; G09F 3/0292; G09F 2003/0222; G09F 2003/0226; G09F 2003/0241; G09F 2003/0257; G09F 2003/0273; G09F 3/10; B65D 23/065; B65D 23/14; B65D 2203/02
See application file for complete search history.

(56) References Cited

U.S. PATENT DOCUMENTS 5,651,481 A * 7/1997 Jensen ................. B65D 23/065
222/569
6,073,816 A * 6/2000 Granberg ................ B01L 99/00
222/571
(Continued)

FOREIGN PATENT DOCUMENTS

DE 10208427 A1 * 9/2003 ........... G09F 3/0291
EP 2952441 A1 * 12/2015 ........... B65D 23/065
(Continued)

OTHER PUBLICATIONS

Machine translation of DE 10208427 A1. (Year: 2003).*
(Continued)

*Primary Examiner* — Patricia L. Nordmeyer
(74) *Attorney, Agent, or Firm* — Maschoff Brennan

(57) ABSTRACT

A label member is configured to be partially removably attached to a bottle of a beverage container. The label member includes a double-sided tape and a flexible drip prevention film. The double-sided tape has a first adhesive surface and a second adhesive surface that are located opposite to each other, and the first adhesive surface is configured to be attached to the bottle. The flexible drip prevention film is removably attached to the second adhesive surface of the double-sided tape, and the flexible drip prevention film is configured to be rollable into a cylindrical tube to be inserted into a mouth of the beverage container after being removed from the double-sided tape. In addition, at least a part of the flexible drip prevention film extends beyond an edge of the second adhesive surface of the double-sided tape.

20 Claims, 8 Drawing Sheets

(51) Int. Cl.
*B65D 23/14* (2006.01)
*G09F 3/00* (2006.01)

(52) U.S. Cl.
CPC ........ *G09F 3/0292* (2013.01); *B65D 2203/02* (2013.01); *G09F 2003/0222* (2013.01); *G09F 2003/0226* (2013.01); *G09F 2003/0241* (2013.01); *G09F 2003/0257* (2013.01); *G09F 2003/0273* (2013.01)

(56) References Cited

U.S. PATENT DOCUMENTS 9,227,760 B2 * 1/2016 Pieriboni ............... B65D 47/40
9,302,833 B1 4/2016 Faye et al.
2005/0023308 A1 * 2/2005 Burato ................. B65D 23/065 222/569
2010/0116854 A1 * 5/2010 Gumpold ............. B65D 23/065 222/566
2011/0290822 A1 * 12/2011 Bouwer ............... B65D 23/065 222/108
2012/0244623 A1 * 9/2012 Patel ..................... G09F 3/0292 374/102
2013/0291417 A1 * 11/2013 Erenguc ................ G09F 3/0288 40/638
2022/0277670 A1 * 9/2022 Young ....................... G09F 3/02

FOREIGN PATENT DOCUMENTS

FR 2773535 A1 * 7/1999 ........... B65D 23/065
GB 2252292 A * 8/1992 ............. B65D 25/20
WO WO-9529474 A1 * 11/1995 ........... G09F 3/0292
WO WO-0188483 A1 * 11/2001 ........... G01K 11/165
WO WO-2006048673 A1 * 5/2006 ........... B65D 23/065
WO WO-2009065157 A1 * 5/2009 ........... B65D 23/065
WO WO-2012038557 A1 * 3/2012 ........... B65D 23/065
WO WO-2019073327 A1 * 4/2019 .......... B01F 13/0022

OTHER PUBLICATIONS

Machine translation of FR 2773535 A1. (Year: 1999).*
Machine translation of WO 2009065157 A1. (Year: 2009).*
Machine translation of WO 2012038557 A1. (Year: 2012).*

* cited by examiner

LABEL AND BEVERAGE CONTAINER WITH LABEL ATTACHED

TECHNICAL FIELD

The present disclosure relates generally to labels and beverage containers with label attached, and more specifically, removable labels with drip prevention design and beverage containers with label attached.

BACKGROUND

Generally, the thickness of the mouth of a container, such as a bottle, is thicker than the neck to allow a cap or a cork to be attached. As a result, the beverage may drip and/or flow down the bottle body when pouring. This phenomenon wastes beverage, and requires cleaning to avoid further contamination. In order to prevent the problem, there are accessories for fluid guidance and drip prevention (e.g., bottle pouring film and drip prevention film) available on the market.

However, beverage products do not include such accessories, inconveniently, consumers are required to buy these accessories separately.

SUMMARY

The present disclosure relates to labels and beverage containers with label attached which address the inconvenience to buy accessories separately in order for fluid guidance or drip prevention.

According to one or more embodiments of this disclosure, a label member is configured to be partially removable after attached to a beverage container. The label member includes a double-sided tape and a flexible drip prevention film. The double-sided tape has a first adhesive surface and a second adhesive surface that are located opposite to each other, and the first adhesive surface is configured to be attached to the bottle. The flexible drip prevention film is removably attached to the second adhesive surface of the double-sided tape, and the flexible drip prevention film is configured to be rollable into a cylindrical tube to be inserted into a mouth of the beverage container after being removed from the double-sided tape. In addition, at least a part of the flexible drip prevention film extends beyond an edge of the second adhesive surface of the double-sided tape.

According to one or more embodiments of this disclosure, a beverage container includes a bottle and a label member. The label member includes a double-sided tape and a flexible drip prevention film. The double-sided tape has a first adhesive surface and a second adhesive surface that are located opposite to each other, and the first adhesive surface is attached to the bottle. The flexible drip prevention film is removably attached to the second adhesive surface of the double-sided tape, and the flexible drip prevention film is configured to be rollable into a cylindrical tube to be inserted into a mouth of the beverage container after being removed from the double-sided tape. In addition, at least a part of the flexible drip prevention film extends beyond an edge of the second adhesive surface of the double-sided tape.

In view of the above description, the flexible drip prevention film of the label member is removable from the double-sided tape and rollable into a cylindrical tube to be inserted into the mouth of the beverage container after being removed from the double-sided tape for fluid guidance and drip prevention. Therefore, when a consumer pours fluid from the bottle of the beverage container, the flexible drip prevention film can guide the fluid and prevent the fluid from dripping or flowing down along the bottle from the mouth. In addition, at least a part of the flexible drip prevention film extends beyond the edge of the second adhesive surface of the double-sided tape, such that the consumer can easily grip the part of the flexible drip prevention film extending beyond the double-sided tape to pull and remove the flexible drip prevention film from the double-sided tape. Consumer can also easily adhere the flexible drip prevention film back to the second adhesive surface without exposing adhesive.

BRIEF DESCRIPTION OF THE DRAWINGS

The embodiments are illustrated by way of example and not by way of limitation in the figures of the accompanying drawings.

DETAILED DESCRIPTION

In the following description, for the purposes of explanation, numerous specific details are set forth in order to provide a thorough understanding. For purposes of explanation, one or more specific embodiments are given to provide a thorough understanding of the invention, and which are described in sufficient detail to enable one skilled in the art to practice the described embodiments. It should be noted the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
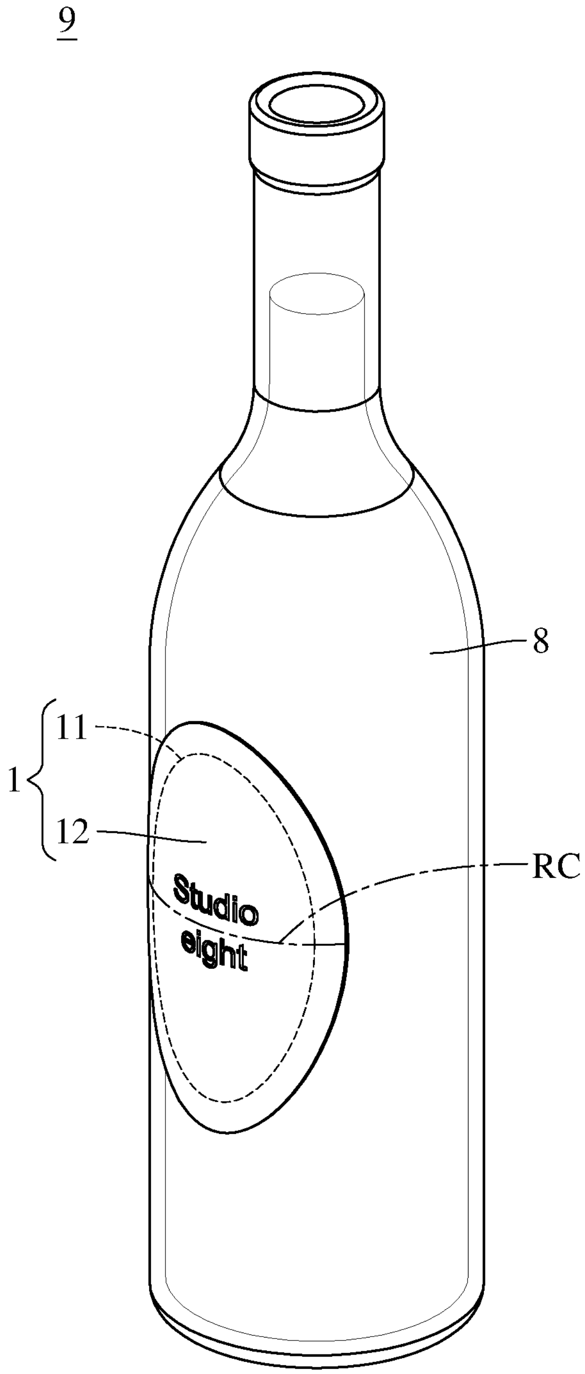
FIG. 1 is a perspective view of a beverage container in accordance with the first embodiment of the present disclosure.
Figure 2:
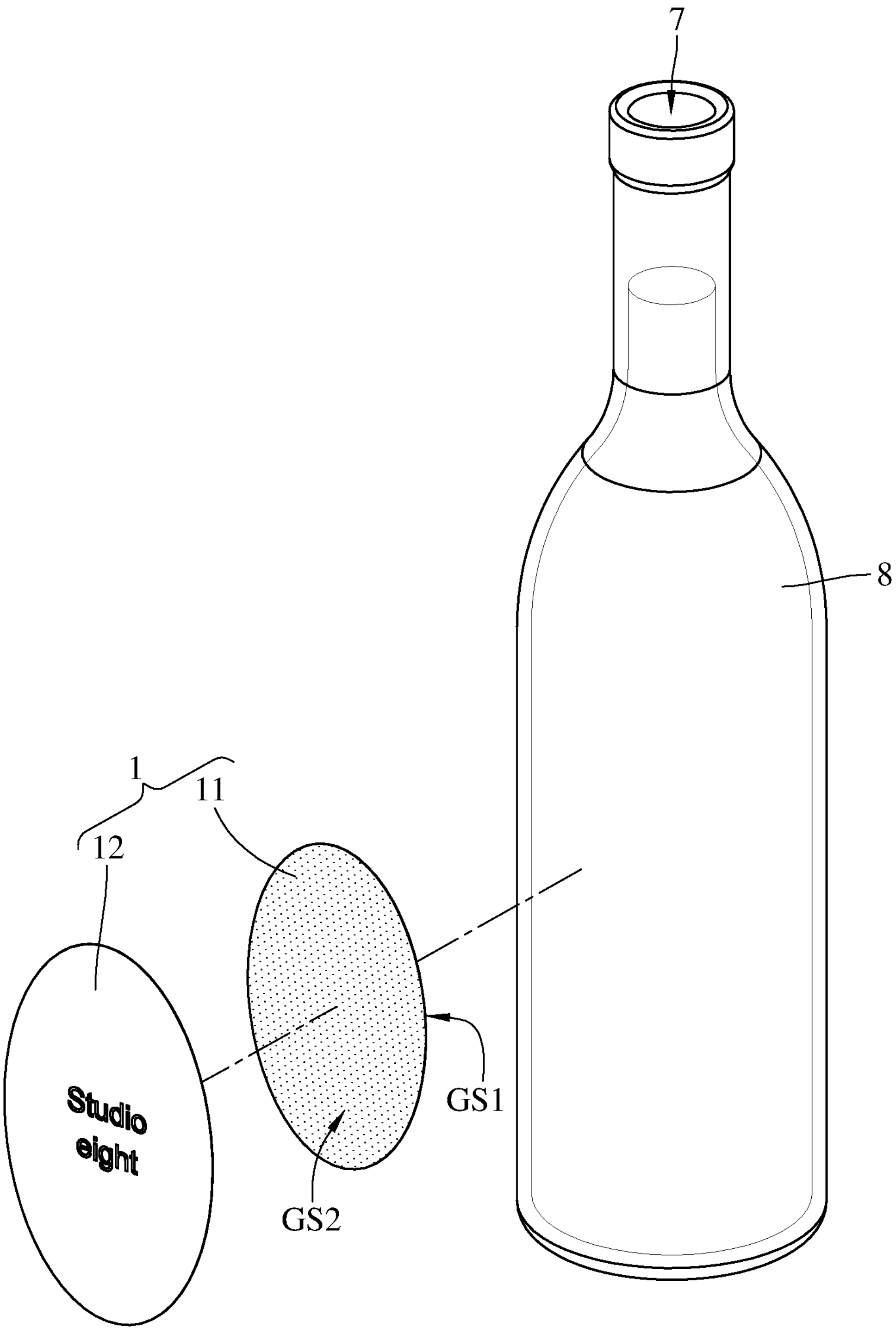
FIG. 2 is an exploded view of the beverage container in FIG. 1.
Figure 3:
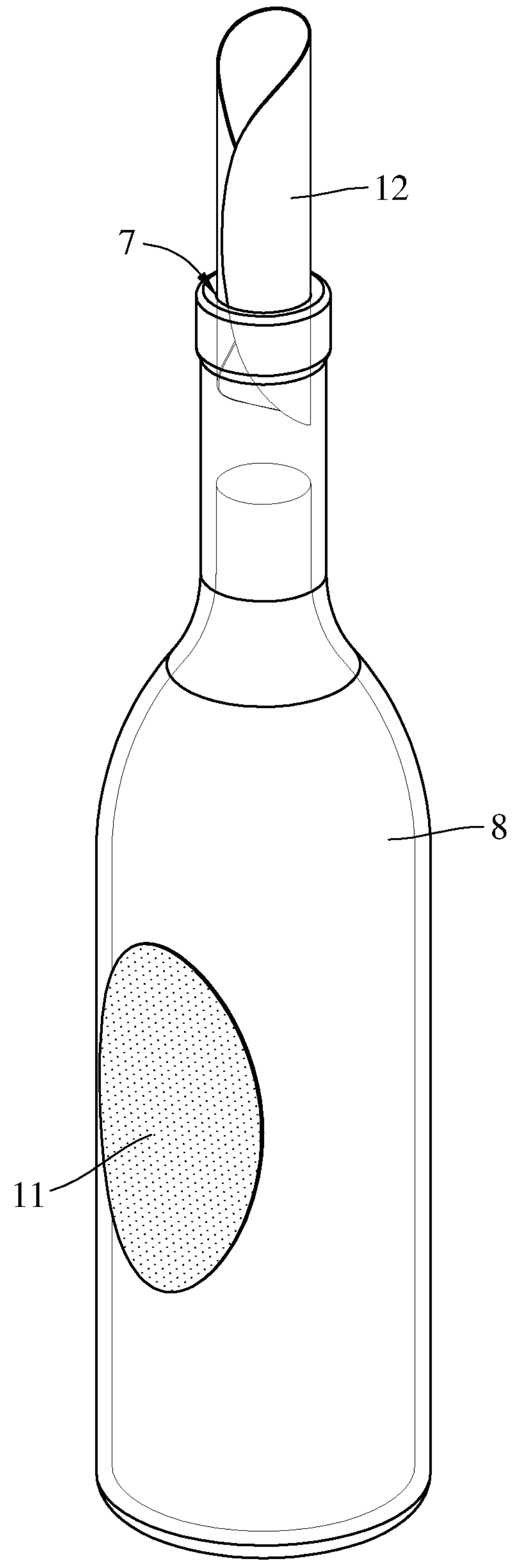
FIG. 3 is a perspective view of the beverage container in FIG. 1 when a flexible drip prevention film of a label member is rolled into a cylindrical tube and inserted into a mouth of the beverage container.

Please refer to FIG. 1 to FIG. 3, where FIG. 1 is a perspective view of a beverage container in accordance with the first embodiment of the present disclosure, FIG. 2 is an exploded view of the beverage container in FIG. 1, and FIG. 3 is a perspective view of the beverage container in FIG. 1 when a flexible drip prevention film of a label member is rolled into a cylindrical tube and inserted into a mouth of the beverage container.

In this embodiment, a beverage container 9 is provided. The beverage container 9 includes a bottle 8 and a label member 1, and the label member 1 includes a double-sided tape 11 and a flexible drip prevention film 12.

The double-sided tape 11 includes a first adhesive layer, a second adhesive layer and an intermediate layer located between the first adhesive layer and the second adhesive layer. The double-sided tape 11 has a first adhesive surface GS1 at the first adhesive layer thereof facing towards the bottle 8, and the double-sided tape 11 has a second adhesive surface GS2 at the second adhesive layer thereof facing away from the bottle 8. The first adhesive surface GS1 of the double-sided tape 11 is attached to the bottle 8, and the flexible drip prevention film 12 is removably attached to the second adhesive surface GS2 of the double-sided tape 11. In this embodiment, the double-sided tape 11 is transparent, the first adhesive layer and the second adhesive layer of the double-sided tape 11 are, for example, polyethylene terephthalate (PET) based adhesive layers, and the intermediate layer is, for example, a polyester film, but the present disclosure is not limited thereto.

A label pattern (e.g., Studio eight) is printed on the flexible drip prevention film 12, showing product information, such as brand or contents. It is noted that the words of the label pattern shown in the figures is only exemplary, and the present disclosure is not limited thereto. In other embodiments, the label pattern may be any desired words or patterns according to actual design requirements. Moreover, the label pattern may be optional, and the present disclosure is not limited thereto.

As shown in FIG. 3, the flexible drip prevention film 12 is removable from the double-sided tape 11, and the flexible drip prevention film 12 can be rolled into a cylindrical tube to be inserted into a mouth 7 of the beverage container 9 after being removed from the double-sided tape 11 for fluid guidance and drip prevention. Therefore, when a consumer pours wine or beverage from the bottle 8 of the beverage container 9, the flexible drip prevention film 12 can guide the wine or other beverages to prevent the beverage from dripping or flowing down along the bottle 8 from the mouth 7. In this or other embodiments, the flexible drip prevention film 12 may have engagement structurers at opposite sides thereof, such that when the flexible drip prevention film 12 is rolled into a cylindrical tube, the engagement structures can be engaged with each other to maintain the shape of the flexible drip prevention film 12, but the present disclosure is not limited thereto.

In this embodiment, the stickiness of the first adhesive layer of the double-sided tape 11 is greater than that of the second adhesive layer of the double-sided tape 11. Therefore, when the consumer pulls to remove the flexible drip prevention film 12 from the double-sided tape 11, the double-sided tape 11 will not be unexpectedly removed from the bottle 8. Moreover, the second adhesive layer enables the flexible drip prevention film 12 to be removed from and attached back to the second adhesive surface GS2 of the double-sided tape 11 repeatedly, such that the consumer may remove the flexible drip prevention film 12 from the mouth 7 and temporarily attach the flexible drip prevention film 12 back onto the double-sided tape 11 on the bottle 8. Therefore, it is convenient for the consumer to reuse the flexible drip prevention film 12 without losing or getting the flexible drip prevention film 12 dirty unexpectedly.

At least a part of the flexible drip prevention film 12 extends beyond an edge of the second adhesive surface GS2 of the double-sided tape 11, such that the consumer can easily grip the part of the flexible drip prevention film 12 extending beyond the double-sided tape 11 to pull and remove the flexible drip prevention film 12 from the double-sided tape 11. In this embodiment, the area of the surface of the flexible drip prevention film 12 facing the double-sided tape 11 is larger than the area of the second adhesive surface GS2 of the double-sided tape 11, such that the periphery of the flexible drip prevention film 12 extends beyond the edge of the double-sided tape 11. Therefore, the consumer can easily grip the periphery of the flexible drip prevention film 12 to remove the flexible drip prevention film 12 from the double-sided tape 11. In addition, consumer can also easily adhere the flexible drip prevention film 12 back to the second adhesive surface GS2 without exposing adhesive. For example, the periphery of the flexible drip prevention film 12 may extend beyond the edge of the double-sided tape 11 by about 2 mm, but the present disclosure is not limited thereto.

In this embodiment, the whole periphery of the flexible drip prevention film 12 extends beyond the edge of the second adhesive surface GS2 of the double-sided tape 11, but the present disclosure is not limited thereto. In some embodiments, only a part of the periphery of the flexible drip prevention film may extend beyond the edge of the second adhesive surface of the double-sided tape. Furthermore, in this and some other embodiments, when the beverage container 9 is placed upright, the label member 1 is configured such that at least the lateral sides of the flexible drip prevention film 12 extend beyond the edge of the second adhesive surface GS2. In specific, as shown in FIG. 1, a reference curved line RC is defined to be located at the surface of the flexible drip prevention film 12 and pass through the center of the flexible drip prevention film 12, the reference curved line RC is parallel to the circumferential direction of the bottle 8, and the reference curved line RC passes through the part of the flexible drip prevention film 12 extending beyond the edge of the second adhesive surface. Therefore, since the flexible drip prevention film is curved when attached to the bottle, it is easier for the consumer to grip the lateral sides of the flexible drip prevention film when the consumer removes the flexible drip prevention film from the double-sided tape compared to the top side (i.e., the side closest to the mouth of the bottle) or the bottom side (i.e., the side closest to the bottom of the bottle) of the flexible drip prevention film, and it is also easier to attach the flexible drip prevention film back onto the double-sided tape.

The flexible drip prevention film 12 may be made of a material including polyethylene terephthalate, and thus, the flexible drip prevention film 12 has a relatively low surface tension to prevent beverage drip when it is used to pour beverage. Furthermore, the flexible drip prevention film 12 being a PET film is favorable for the flexible drip prevention film 12 to be easily rolled into a cylindrical tube to be inserted into the mouth 7 of the beverage container 9. In addition, the flexible drip prevention film 12 may have high tearing resistance and alcohol/chemical resistance, so that the flexible drip prevention film 12 may not deteriorate or be damaged when it is in contact with alcohol or juice. Moreover, the flexible drip prevention film 12 can be cleaned/rinsed for sanitary and reuse purposes. In this embodiment, the flexible drip prevention film 12 is translucent, but the present disclosure is not limited thereto. In other embodiments, the flexible drip prevention film may be transparent or opaque.

The ink material of the label pattern may be a synthetic ink specially formulated for polyethylene terephthalate material, so that the label pattern may have high alcohol/chemical resistance and may have good scratch resistance to ensure that the label pattern does not easily peel off from the flexible drip prevention film 12. In this embodiment, the label pattern is, for example, halogen-free and meets U.S. Food and Drug Administration (FDA) requirements.

In this embodiment, the label member 1 is in an elliptical shape, but the present disclosure is not limited thereto. In other embodiments, the label member may be in other shapes, such as circular or rectangular shapes, according to actual design requirements.

The present disclosure is not limited to the position where the label member 1 is attached to the bottle 8 in the first embodiment. In other embodiments, the label member may be attached to the neck or bottom of the bottle according to actual design requirements.

Figure 4:
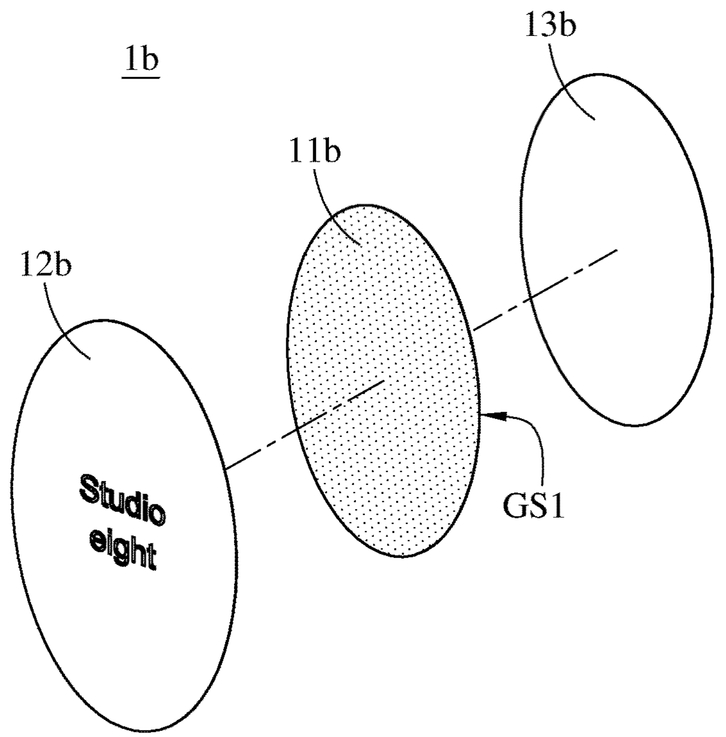
FIG. 4 is an exploded view of a label member in accordance with the second embodiment of the present disclosure.

Please refer to FIG. 4, which is an exploded view of a label member in accordance with the second embodiment of the present disclosure.

In this embodiment, a label member 1*b* is provided. The label member 1*b* includes a double-sided tape 11*b*, a flexible drip prevention film 12*b* and a release liner 13*b*. The structures and corresponding effects of the double-sided tape 11*b* and the flexible drip prevention film 12*b* are substantially the same or similar to those of the double-sided tape 11 and the flexible drip prevention film 12 as described in the first embodiment, and thus, an explanation in this regard will not be provided again.

The release liner 13*b* is, for example, a glassine release paper, and the release liner 13*b* is removably attached to a first adhesive surface GS1 of the double-sided tape 11*b*. Before the label member 1*b* is attached to a beverage container, the first adhesive surface GS1 of the double-sided tape 11*b* should be covered by the release liner 13*b* to prevent the first adhesive surface GS1 from accidentally adhering to alien objects during manufacturing processes or shipping of the label member 1*b*. Moreover, before the attachment of the label member 1*b* to the bottle of the beverage container, the release liner 13*b* should be removed from the first adhesive surface GS1 of the double-sided tape 11*b* in advance, so that the first adhesive surface GS1 can be attached to the bottle.

Figure 5:
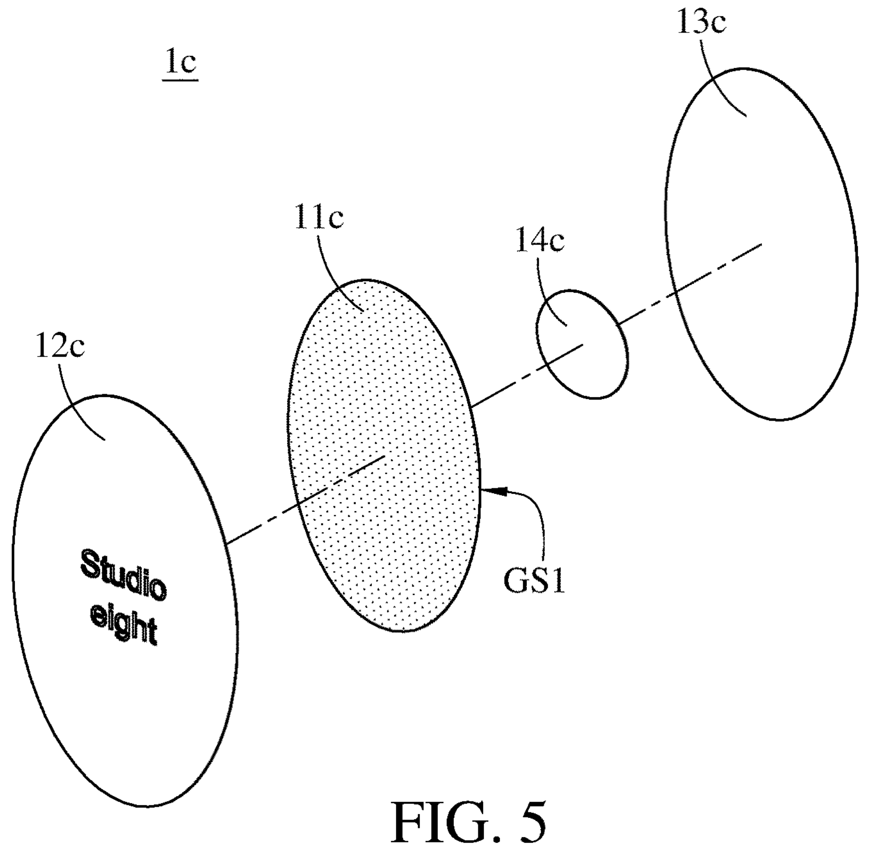
FIG. 5 is an exploded view of a label member in accordance with the third embodiment of the present disclosure.

Please refer to FIG. 5, which is an exploded view of a label member in accordance with the third embodiment of the present disclosure.

In this embodiment, a label member 1*c* is provided. The label member 1*c* includes a double-sided tape 11*c*, a flexible drip prevention film 12*c*, a release liner 13*c* and a temperature authentication pattern 14*c*. The structures and corresponding effects of the double-sided tape 11*c*, the flexible drip prevention film 12*c* and the release liner 13*c* are substantially the same or similar to those of the double-sided tape 11 and the flexible drip prevention film 12 as described in the first embodiment and those of the release liner 13*b* as described in the second embodiment, and thus, an explanation in this regard will not be provided again.

In this embodiment, the double-sided tape 11*c* and the flexible drip prevention film 12*c* are transparent or translucent, the temperature authentication pattern 14*c* is formed on the first adhesive surface GS1 of the double-sided tape 11*c* by, for example, printing, and the temperature authentication pattern 14*c* may change to a marked state permanently from an unmarked state once the temperature of the temperature authentication pattern 14*c* is equal to or higher than a predetermined temperature. Therefore, when the label member 1*c* is attached to a bottle of a beverage container after the release liner 13*c* had been removed from the label member 1*c*, consumers and store salesmen can identify whether the beverage is exposed to the environment of a predetermined temperature or higher temperature or not during shipping or in storage, thereby preventing spoiled products from being purchased by the consumers. Moreover, the temperature authentication pattern 14*c* in the marked state may appear any desired words or patterns, and the present disclosure is not limited thereto. Said the temperature authentication pattern 14*c* changing to a marked state from an unmarked state may become visible from transparent as an example.

Figure 6:
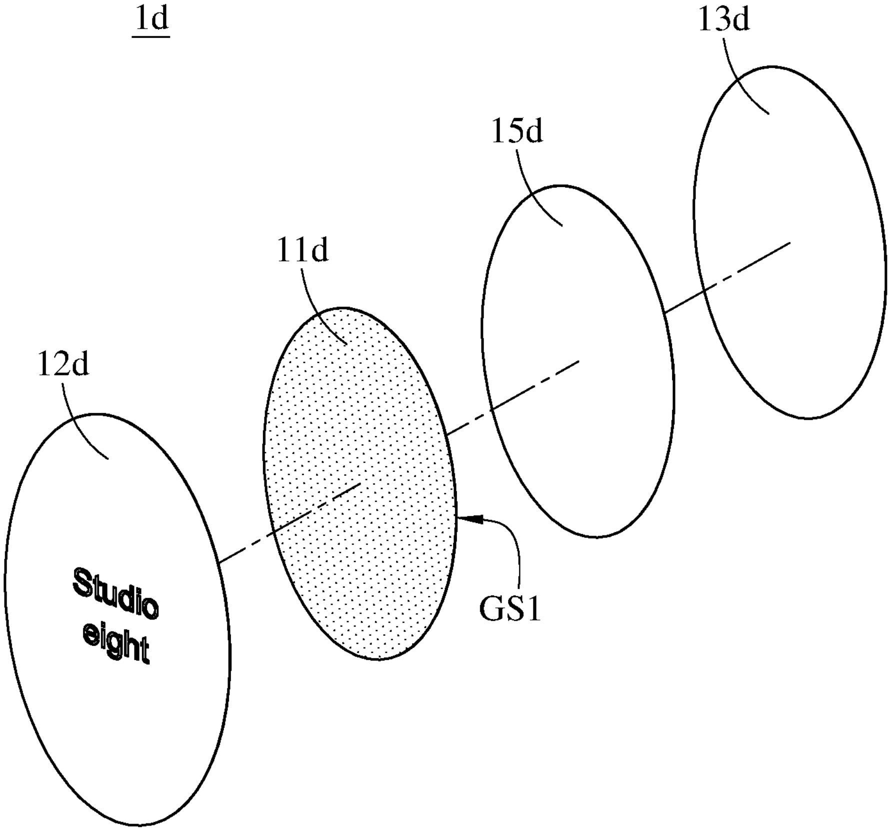
FIG. 6 is an exploded view of a label member in accordance with the fourth embodiment of the present disclosure.

Please refer to FIG. 6, which is an exploded view of a label member in accordance with the fourth embodiment of the present disclosure.

In this embodiment, a label member 1*d* is provided. The label member 1*d* includes a double-sided tape 11*d*, a flexible drip prevention film 12*d*, a release liner 13*d* and a tamper-proof layer 15*d*. The structures and corresponding effects of the double-sided tape 11*d*, the flexible drip prevention film 12*d* and the release liner 13*d* are substantially the same or similar to those of the double-sided tape 11 and the flexible drip prevention film 12 as described in the first embodiment and those of the release liner 13*b* as described in the second embodiment, and thus, an explanation in this regard will not be provided again.

In this embodiment, the tamper-proof layer 15*d* is, for example, an acrylic adhesive and disposed on the first adhesive surface GS1 of the double-sided tape 11*d*, and the tamper-proof layer 15*d* is configured to be at least partially irremovably fixed to a bottle of a beverage container. Therefore, when the label member 1*d* is attached to the bottle of the beverage container after the release liner 13*d* had been removed from the label member 1*d*, the tamper-proof layer 15*d* is at least partially irremovably fixed to the bottle, such that when a consumer removes the label member 1*d* from the bottle, the tamper-proof layer 15*d* leaves indications on the bottle. Therefore, the label member 1*d* or the beverage container can be prevented from being tampered or reused inappropriately. Said indications left on the bottle by the tamper-proof layer 15*d* may be any patterns or words, and the present disclosure is not limited thereto.

Figure 7:
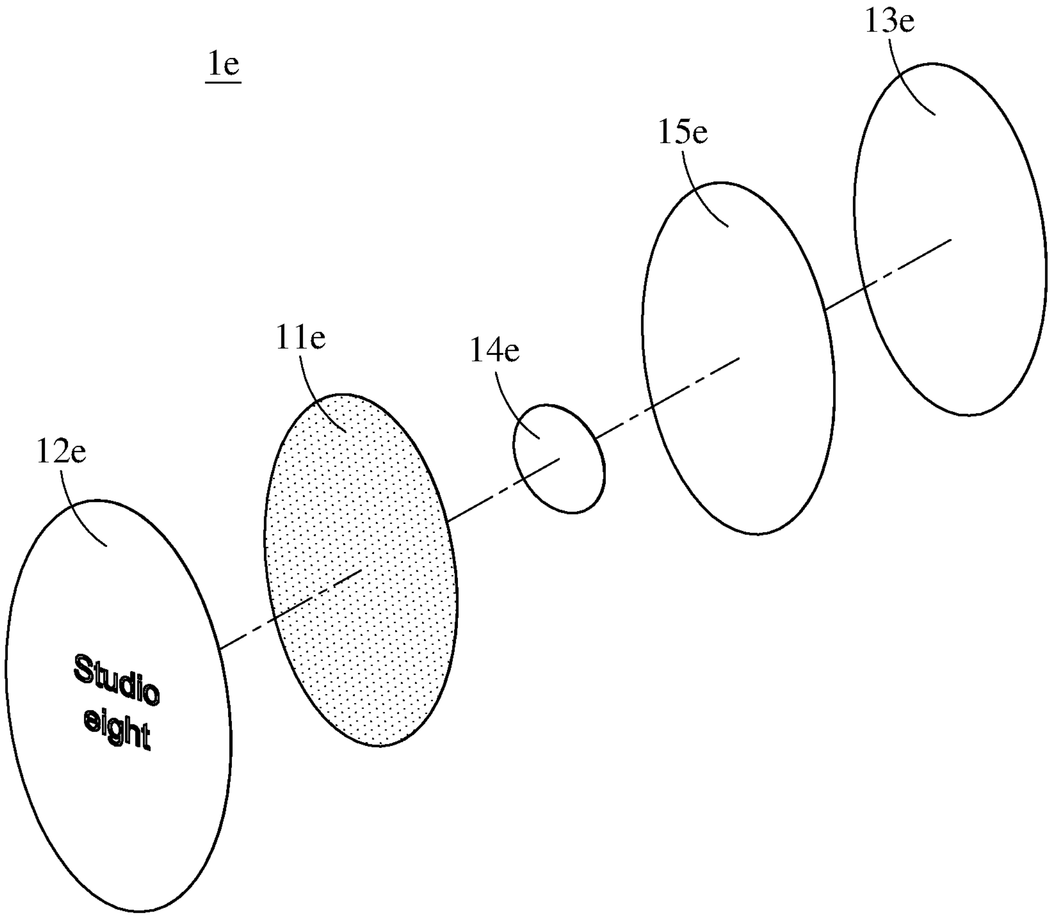
FIG. 7 is an exploded view of a label member in accordance with the fifth embodiment of the present disclosure.

Please refer to FIG. 7, which is an exploded view of a label member in accordance with the fifth embodiment of the present disclosure.

In this embodiment, a label member 1*e* is provided. The label member 1*e* includes a double-sided tape 11*e*, a flexible drip prevention film 12*e*, a temperature authentication pattern 14*e*, a tamper-proof layer 15*e* and a release liner 13*e*. The structures and corresponding effects of the components are substantially the same or similar to those of the corresponding components as described in the above embodiments, and thus, an explanation in this regard will not be provided again.

Figure 8:
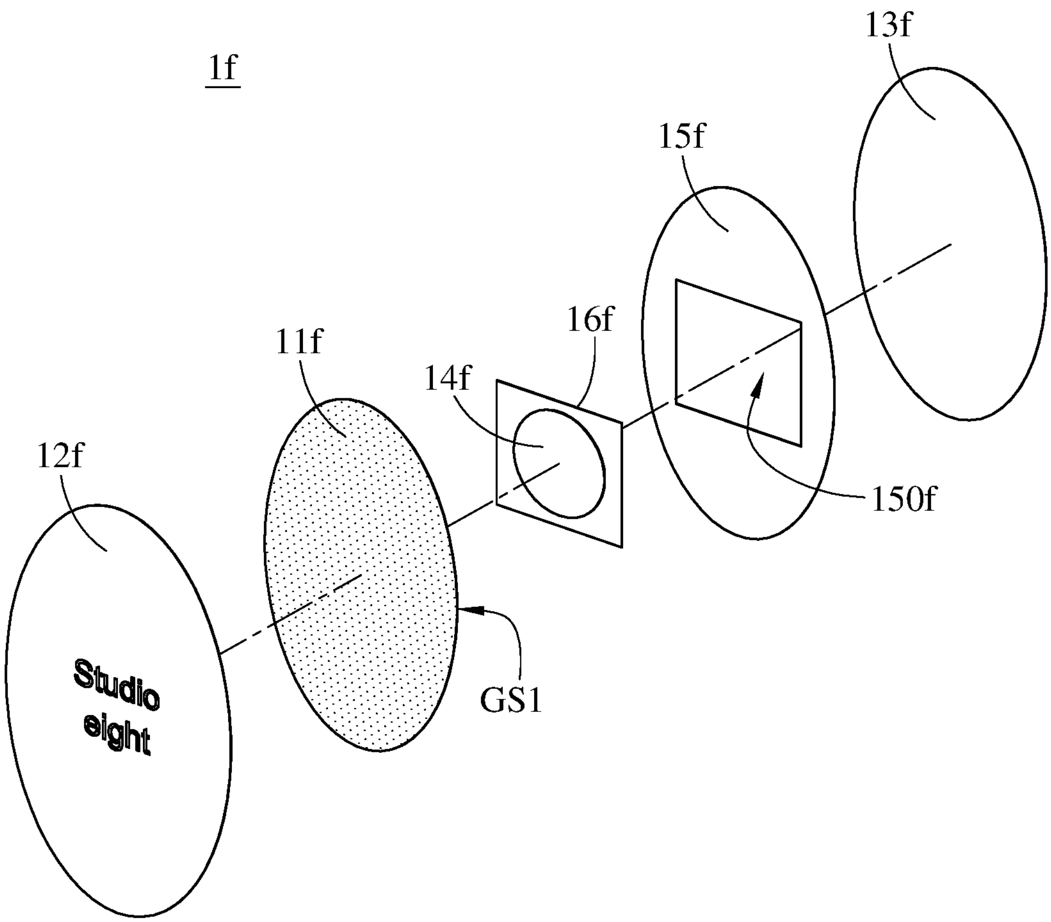
FIG. 8 is an exploded view of a label member in accordance with the sixth embodiment of the present disclosure.

Please refer to FIG. 8, which is an exploded view of a label member in accordance with the sixth embodiment of the present disclosure.

In this embodiment, a label member if is provided. The label member if includes a double-sided tape 11*f*, a flexible drip prevention film 12*f*, a temperature authentication film 16*f*, a tamper-proof layer 15*f* and a release liner 13*f*. The structures and corresponding effects of the double-sided tape 11*f*, the flexible drip prevention film 12*f*, and the release liner 13*f* are substantially the same or similar to those of the corresponding components as described in the above embodiments, and thus, an explanation in this regard will not be provided again.

In this embodiment, the tamper-proof layer 15*f* has a through hole 150*f*. The shape and size of the temperature authentication film 16*f* are substantially the same as those of the through hole 150*f*, and the thickness of the tamper-proof layer 15*f* may be equal to that of the temperature authentication film 16f. The temperature authentication film 16f is located in the through hole 150f and attached to the first adhesive surface GS1 of the double-sided tape 11f. The double-sided tape 1 if and the flexible drip prevention film 12f are transparent or translucent. A temperature authentication pattern 14f is formed on the temperature authentication film 16f by, for example, printing, and the temperature authentication pattern 14f is visible through the double-sided tape 1 if and the flexible drip prevention film 12f. The temperature authentication pattern 14f is configured to change to a marked state permanently from an unmarked state once the temperature of the temperature authentication pattern 14f is equal to or higher than a predetermined temperature. Moreover, the temperature authentication pattern 14f may be any words or patterns, and the present disclosure is not limited thereto. Said the temperature authentication pattern 14f changing to a marked state from an unmarked state may become visible from transparent as an example.

In this embodiment, the temperature authentication film 16f and the tamper-proof layer 15f of the label member if are formed in the same layer, such that the whole label member if has a relatively even thickness so as to ensure the flatness of the label member If.

In this embodiment, the temperature authentication film 16f and the tamper-proof layer 15f are formed in the same layer, but the present disclosure is not limited thereto. In other embodiments, a through hole may be formed on the double-sided tape, and the temperature authentication film may be located in the through hole of the double-sided tape and attached to the tamper-proof layer, such that the temperature authentication film and the double-sided tape are formed in the same layer.

Figure 9:
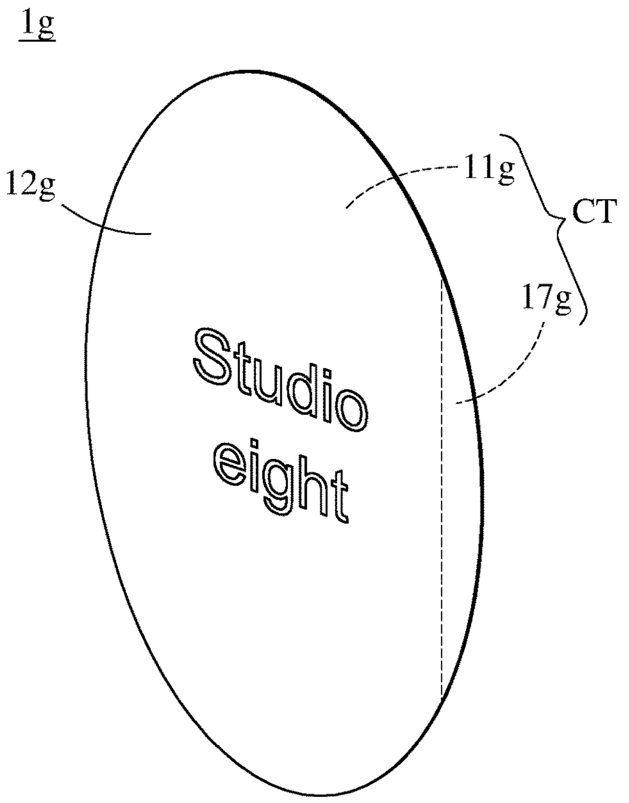
FIG. 9 is a perspective view of a label member in accordance with the seventh embodiment of the present disclosure.
Figure 10:
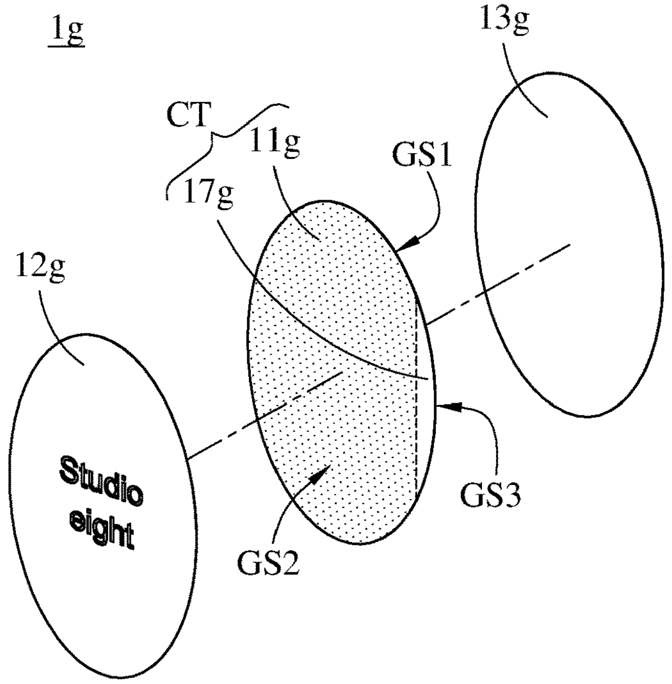
FIG. 10 is an exploded view of the label member in FIG. 9.

Please refer to FIG. 9 and FIG. 10, where FIG. 9 is a perspective view of a label member in accordance with the seventh embodiment of the present disclosure, and FIG. 10 is an exploded view of the label member in FIG. 9.

In this embodiment, a label member Ig is provided. The label member Ig includes a composite tape CT, a flexible drip prevention film 12g and a release liner 13g. The composite tape CT includes a double-sided adhesive area and a single-sided adhesive area. The double-sided adhesive area may be a double-sided tape 11g, and the single-sided adhesive area may be a single-sided tape 17g. Moreover, the structures and corresponding effects of the double-sided tape 11g, the flexible drip prevention film 12g and the release liner 13g are substantially the same or similar to those of the double-sided tape 11 and the flexible drip prevention film 12 as described in the first embodiment and the release liner 13b as described in the second embodiment, and thus, an explanation in this regard will not be provided again.

The single-sided tape 17g is connected at least a part of a periphery of the double-sided tape 11g. The single-sided tape 17g has a single side adhesive surface GS3 configured to be attached to a bottle.

The release liner 13g is removably attached to the first adhesive surface GS1 of the double-sided tape 11g and the single side adhesive surface GS3 of the single-sided tape 17g. Before the label member Ig is attached to a beverage container, the first adhesive surface GS1 of the double-sided tape 11g and the single side adhesive surface GS3 of the single-sided tape 17g should be covered by the release liner 13g to prevent the first adhesive surface GS1 and the single side adhesive surface GS3 from accidentally adhering to alien objects during manufacturing processes or shipping of the label member 1g. Moreover, before the attachment of the label member Ig to the bottle of the beverage container, the release liner 13g should be removed from the first adhesive surface GS1 of the double-sided tape 11g and the single side adhesive surface GS3 of the single-sided tape 17g in advance, so that the first adhesive surface GS1 and the single side adhesive surface GS3 can be attached to the bottle.

The flexible drip prevention film 12g is removably attached to the second adhesive surface GS2 of the double-sided adhesive area (i.e., the double-sided tape 11g) of the composite tape CT, and at least a part of the flexible drip prevention film 12g extends beyond the edge of the second adhesive surface GS2.

In this embodiment, the edge of the flexible drip prevention film 12g may be flush with the edge of the composite tape CT, and thus does not extend beyond the edge of the composite tape CT. However, at least a part of the flexible drip prevention film 12g extends beyond the edge of the second adhesive surface GS2 of the double-sided tape 11g, such that a part of the flexible drip prevention film 12g overlapping the single-sided tape 17g is not adhered to the composite tape CT. Therefore, it is easier for the consumer to grip the flexible drip prevention film 12g to remove the flexible drip prevention film 12g from the composite tape CT. However, the present disclosure is not limited thereto. For example, in other embodiments, there may be a part of the flexible drip prevention film extending beyond the edge of the composite tape, or the whole periphery of the flexible drip prevention film may extend beyond the edge of the composite tape.

In this embodiment, the single-sided tape 17g is connected to a part of the periphery of the double-sided tape 11g and located on one side of the double-sided tape 11g, but the present disclosure is not limited thereto. In other embodiments, the single-sided tape may surround the periphery of the double-sided tape.

In view of the above description, the flexible drip prevention film of the label member is removable from the double-sided tape, and the flexible drip prevention film after being removed from the double-sided tape can be rolled into a cylindrical tube to be inserted into the mouth of the beverage container for fluid guidance and drip prevention. Therefore, when a consumer pours fluid from the bottle of the beverage container, the flexible drip prevention film can guide the fluid and prevent the fluid from dripping or flowing down along the bottle from the mouth. In addition, at least a part of the flexible drip prevention film extends beyond the edge of the second adhesive surface of the double-sided tape, such that the consumer can easily grip the part of the flexible drip prevention film extending beyond the double-sided tape to pull and remove the flexible drip prevention film from the double-sided tape. Consumer can also easily adhere the flexible drip prevention film back to the second adhesive surface without exposing adhesive.

In some configurations, a label pattern is printed on the flexible drip prevention film for showing product information, such as brand or contents.

In some configurations, the stickiness of the first adhesive layer of the double-sided tape is greater than that of the second adhesive layer of the double-sided tape. Therefore, when the consumer pulls the flexible drip prevention film to remove the flexible drip prevention film, the double-sided tape will not unexpectedly remove from the bottle as well. Moreover, the second adhesive layer enables the flexible drip prevention film to be removed from and attached back to the second adhesive surface of the double-sided tape repeatedly, such that the consumer may remove the flexible drip prevention film from the mouth and attach the flexible drip prevention film back onto the double-sided tape on the bottle. Therefore, it is convenient for the consumer to reuse the flexible drip prevention film without losing or getting the flexible drip prevention film dirty unexpectedly.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A label member configured to be partially removably attached to a bottle of a beverage container, and the label member comprising:

a double-sided tape having a first adhesive surface and a second adhesive surface that are located opposite to each other, and the first adhesive surface configured to be attached to the bottle; and a flexible drip prevention film removably attached to the second adhesive surface of the double-sided tape, and the flexible drip prevention film configured to be rollable into a cylindrical tube to be inserted into a mouth of the beverage container after being removed from the double-sided tape;

wherein at least a part of the flexible drip prevention film extends beyond an edge of the second adhesive surface of the double-sided tape, and a surface of the flexible drip prevention film facing the double-sided tape only partially contacts the double-sided tape;

wherein the label member further comprises a single-sided tape connected to at least a part of a periphery of the double-sided tape, and the single-sided tape has a single side adhesive surface configured to be attached to the bottle.

2. A beverage container comprising:

a bottle; and the label member according to claim 1.

3. A label member configured to be partially removably attached to a bottle of a beverage container, and the label member comprising:

a double-sided tape having a first adhesive surface and a second adhesive surface that are located opposite to each other, and the first adhesive surface configured to be attached to the bottle; and a flexible drip prevention film removably attached to the second adhesive surface of the double-sided tape, and the flexible drip prevention film configured to be rollable into a cylindrical tube to be inserted into a mouth of the beverage container after being removed from the double-sided tape;

wherein at least a part of the flexible drip prevention film extends beyond an edge of the second adhesive surface of the double-sided tape, and a surface of the flexible drip prevention film facing the double-sided tape only partially contacts the double-sided tape;

wherein the double-sided tape comprises a first adhesive layer, a second adhesive layer, and an intermediate layer located between the first adhesive layer and the second adhesive layer, the first adhesive layer and the second adhesive layer are PET-based adhesive layers, the intermediate layer is a polyester film, the first adhesive surface is located at the first adhesive layer, the second adhesive surface is located at the second adhesive layer, and a stickiness of the first adhesive layer is greater than a stickiness of the second adhesive layer.

4. The label member according to claim 3, further comprising a release liner removably attached to the first adhesive surface.

5. The label member according to claim 3, wherein a label pattern is printed on the flexible drip prevention film.

6. The label member according to claim 5, wherein the label pattern is made of a material comprising polyethylene terephthalate (PET).

7. The label member according to claim 3, wherein the flexible drip prevention film is made of a material comprising polyethylene terephthalate.

8. The label member according to claim 3, further comprising a temperature authentication pattern, wherein the double-sided tape and the flexible drip prevention film are transparent or translucent, the temperature authentication pattern is formed on the first adhesive surface of the double-sided tape, and the temperature authentication pattern is configured to change to a marked state from an unmarked state once a temperature of the temperature authentication pattern is equal to or higher than a predetermined temperature.

9. The label member according to claim 3, further comprising a tamper-proof layer disposed on the first adhesive surface of the double-sided tape, wherein the tamper-proof layer is configured to be at least partially irremovably fixed to the bottle.

10. The label member according to claim 9, wherein the tamper-proof layer is an acrylic adhesive.

11. The label member according to claim 9, further comprising a temperature authentication film, wherein the tamper-proof layer has a through hole, the temperature authentication film is located in the through hole and attached to the first adhesive surface of the double-sided tape, the double-sided tape and the flexible drip prevention film are transparent or translucent, a temperature authentication pattern is formed on the temperature authentication film, the temperature authentication pattern is visible through the double-sided tape and the flexible drip prevention film, and the temperature authentication pattern is configured to change to a marked state from an unmarked state once a temperature of the temperature authentication pattern is equal to or higher than a predetermined temperature.

12. A beverage container comprising:

a bottle; and a label member comprising:

a double-sided tape having a first adhesive surface and a second adhesive surface that are located opposite to each other, and the first adhesive surface attached to the bottle; and a flexible drip prevention film removably attached to the second adhesive surface of the double-sided tape, and the flexible drip prevention film configured to be rollable into a cylindrical tube to be inserted into a mouth of the beverage container after being removed from the double-sided tape;

wherein at least a part of the flexible drip prevention film extends beyond an edge of the second adhesive surface of the double-sided tape, and a surface of the flexible drip prevention film facing the double-sided tape only partially contacts the double-sided tape;

wherein the double-sided tape comprises a first adhesive layer, a second adhesive layer, and an intermediate layer located between the first adhesive layer and the second adhesive layer, the first adhesive layer and the second adhesive layer are PET-based adhesive layers, the intermediate layer is a polyester film, the first adhesive surface is located at the first adhesive layer, the second adhesive surface is located at the second adhesive layer, and a stickiness of the first adhesive layer is greater than a stickiness of the second adhesive layer.

13. The beverage container according to claim 12, wherein a label pattern is printed on the flexible drip prevention film.

14. The beverage container according to claim 13, wherein the label pattern is made of a material comprising polyethylene terephthalate.

15. The beverage container according to claim 12, wherein the flexible drip prevention film is made of a material comprising polyethylene terephthalate.

16. The beverage container according to claim 12, wherein the label member further comprises a temperature authentication pattern, the double-sided tape and the flexible drip prevention film are transparent or translucent, the temperature authentication pattern is formed on the first adhesive surface of the double-sided tape, and the temperature authentication pattern is configured to change to a marked state from an unmarked state once a temperature of the temperature authentication pattern is equal to or higher than a predetermined temperature.

17. The beverage container according to claim 12, wherein the label member further comprises a tamper-proof layer disposed on the first adhesive surface of the double-sided tape, and the tamper-proof layer is configured to be at least partially irremovably fixed to the bottle.

18. The beverage container according to claim 17, wherein the tamper-proof layer is an acrylic adhesive.

19. The beverage container according to claim 17, wherein the label member further comprises a temperature authentication film, the tamper-proof layer has a through hole, the temperature authentication film is located in the through hole and attached to the first adhesive surface of the double-sided tape, the double-sided tape and the flexible drip prevention film are transparent or translucent, a temperature authentication pattern is formed on the temperature authentication film, the temperature authentication pattern is visible through the double-sided tape and the flexible drip prevention film, and the temperature authentication pattern is configured to change to a marked state from an unmarked state once a temperature of the temperature authentication pattern is equal to or higher than a predetermined temperature.

20. The beverage container according to claim 12, wherein a reference curved line is defined to be located at a surface of the flexible drip prevention film and pass through a center of the flexible drip prevention film, the reference curved line is parallel to a circumferential direction of the bottle, and the reference curved line passes through the at least a part of the flexible drip prevention film extending beyond the edge of the second adhesive surface.

* * * * *